(12) United States Patent
Karlinsky et al.

(10) Patent No.: US 11,475,313 B2
(45) Date of Patent: Oct. 18, 2022

(54) UNSUPERVISED, SEMI-SUPERVISED, AND SUPERVISED LEARNING USING DEEP LEARNING BASED PROBABILISTIC GENERATIVE MODELS

(71) Applicant: International Business Machines Corporation, Armonk, NY (US)

(72) Inventors: Leonid Karlinsky, Mazkeret Batya (IL); Joseph Shtok, Binyamina (IL)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 16/789,482

(22) Filed: Feb. 13, 2020

(65) Prior Publication Data

US 2021/0256391 A1    Aug. 19, 2021

(51) Int. Cl.
*G06N 3/08* (2006.01)
*G06N 3/04* (2006.01)

(52) U.S. Cl.
CPC .......... *G06N 3/088* (2013.01); *G06N 3/0454* (2013.01); *G06N 3/0472* (2013.01)

(58) Field of Classification Search
CPC .... G06N 3/088; G06N 3/0454; G06N 3/0472; G06V 10/763
See application file for complete search history.

(56) References Cited

U.S. PATENT DOCUMENTS

| 2018/0247183 | A1 | 8/2018 | Kanebako | |
| 2018/0260628 | A1 | 9/2018 | Namiki et al. | |
| 2019/0122072 | A1 | 4/2019 | Cricri et al. | |
| 2019/0130278 | A1 | 5/2019 | Karras et al. | |
| 2020/0134423 | A1* | 4/2020 | Shinde | G06F 11/3447 |
| 2021/0019628 | A1* | 1/2021 | Yao | G06N 3/082 |

\* cited by examiner

*Primary Examiner* — Manuel A Rivera Vargas
(74) *Attorney, Agent, or Firm* — Gregory J Kirsch (57) ABSTRACT

Embodiments of the present systems and methods may provide techniques to discover features such as object categories that provide improved accuracy and performance. For example, in an embodiment, a method may comprise extracting, at the computer system, features from a dataset comprising a plurality of data samples using a backbone neural network to form a features vector for each data sample, training, at the computer system, using the features vectors for at least some of the plurality of data samples, an unsupervised generative probabilistic model to perform clustering of extracted features of the at least some of the plurality of data samples by minimizing a negative Log-Likelihood function, wherein clusters of extracted features form categories, and categorizing, at the computer system, at least some different data samples of the plurality of data samples, into the formed categories.

20 Claims, 9 Drawing Sheets

UNSUPERVISED, SEMI-SUPERVISED, AND SUPERVISED LEARNING USING DEEP LEARNING BASED PROBABILISTIC GENERATIVE MODELS

BACKGROUND

The present invention relates to techniques to discover features in data such as object categories using unsupervised probabilistic generative models.

For many practical applications, it is beneficial to learn the structure of the data involved, and in particular its semantic structure, without any supervision. Semantic structure refers to the automatic discovery of features such as object categories, object locations (bounding boxes, instance level segments, etc.), poses, attributes, etc. in image data; and to automatic discovery of actions and activities in video data. Automatic discovery and analysis of the semantic structures allows for (i) pro-active data pre-processing systems for active human annotation—proposing the discovered structure to the user for manual verification, and labeling (naming), (ii) semi-supervised learning via multi-task learning of supervised and unsupervised tasks; and (iii) enhancing any supervised learning model with intermediate sub-modules performing unsupervised discovery, for enhanced performance and interpret-ability of intermediate level computations in neural networks.

Conventional techniques may include approaches such as iterative external clustering of the data (for example, k-means, or agglomerative clustering) interleaved with model updates that are using the cluster assignments as a target class labels (for example, using cross-entropy and related losses), and implementing center-based clustering (each cluster is represented by a center point) as part of the network. Such approaches may not provide the desired accuracy or performance.

Accordingly, a need arises for techniques to discover features such as object categories that provide improved accuracy and performance.

SUMMARY

Embodiments of the present systems and methods may provide techniques to discover features such as object categories that provide improved accuracy and performance. Embodiments may utilize a Deep Learning (DL) model and an associated Stochastic Gradient Descent (SGD) based learning scheme, to learn parameters of a generative probabilistic model "explaining" the observed training data. This "explaining" may be achieved by maximizing the log-likelihood of the learned generative model on the observed data formulated as a loss for the DL training. In embodiments, some of the generative model parameters may be represented as weights of a feed forward network, operating directly on the inputs and learning jointly with the generative model to represent those distributions.

For example, in an embodiment, a method, may be implemented in a computer comprising a processor, memory accessible by the processor, and computer program instructions stored in the memory and executable by the processor, the method may comprise extracting, at the computer system, features from a dataset comprising a plurality of data samples using a backbone neural network to form a features vector for each data sample, training, at the computer system, using the features vectors for at least some of the plurality of data samples, an unsupervised generative probabilistic model to perform clustering of extracted features of the at least some of the plurality of data samples by minimizing a negative Log-Likelihood function, wherein clusters of extracted features form categories, and categorizing, at the computer system, at least some different data samples of the plurality of data samples, into the formed categories.

In embodiments, the unsupervised generative probabilistic model may comprise a mixture component convolutional neural network to accept the features vectors and to output distributions of possible values over unobserved variables of the model, a generative convolutional neural network to accept the features vectors and the distributions over the unobserved variables and to output a negative log likelihood, and a negative log likelihood loss to reduce the negative log likelihood. The unsupervised generative probabilistic model may comprise a mixture component convolutional neural network to accept the features vectors and to output a mixture component vector indicating a conditional probability that each feature vector belongs to each mixture component and computing, at the computer system, a probability that each topic is associated with each data sample based on the mixture component vector indicating a conditional probability that each feature vector belongs to each mixture component and based on a Gaussian distribution associated with each mixture component. The unsupervised generative probabilistic model may comprise a multinomial distribution of topic given document to accept the features vectors and to output a topic vector indicating a conditional probability that each feature vector belongs to each topic. The method may further comprise computing, at the computer system, a probability that each topic is associated with each data sample based on the topic vector returned by the mixture component convolutional network and indicating a conditional probability that each feature vector belongs to each topic, multiplied by matrix of model weights, converting topics to words, and defining the log-frequencies of each conversion, and further multiplied by the feature vector. The method may further comprise generating, at the computer system, a topic vector indicating a conditional probability that each image represented by a feature vector belongs to each topic, and thus discovering the categories present in the data without any supervision and training, at the computer system, a classifier model using a semi-supervised process including at least some labeled data samples, and applying a classification loss function. The method may further comprise using the method between intermediate layers of a neural network to learn a global context to uncontrolled intermediate features.

In an embodiment, a system may comprise a processor, memory accessible by the processor, and computer program instructions stored in the memory and executable by the processor to perform extracting, at the computer system, features from a dataset comprising a plurality of data samples using a backbone neural network to form a features vector for each data sample, training, at the computer system, using the features vectors for at least some of the plurality of data samples, an unsupervised generative probabilistic model to perform clustering of extracted features of the at least some of the plurality of data samples by minimizing a negative Log-Likelihood function, wherein clusters of extracted features form categories, and categorizing, at the computer system, at least some different data samples of the plurality of data samples, into the formed categories.

In an embodiment, a computer program product may comprise a non-transitory computer readable storage having program instructions embodied therewith, the program instructions executable by a computer, to cause the computer to perform a method comprising extracting, at the computer system, features from a dataset comprising a plurality of data samples using a backbone neural network to form a features vector for each data sample, training, at the computer system, using the features vectors for at least some of the plurality of data samples, an unsupervised generative probabilistic model to perform clustering of extracted features of the at least some of the plurality of data samples by minimizing a negative Log-Likelihood function, wherein clusters of extracted features form categories, and categorizing, at the computer system, at least some different data samples of the plurality of data samples, into the formed categories.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present systems and methods may provide techniques to discover features such as object categories that provide improved accuracy and performance. Embodiments may utilize a Deep Learning (DL) model and an associated Stochastic Gradient Descent (SGD) based learning scheme, to learn parameters of a generative probabilistic model "explaining" the observed training data. This "explaining" may be achieved by maximizing the log-likelihood of the learned generative model on the observed data formulated as a loss for the DL training. In embodiments, some of the generative model parameters may be represented as weights of a feed forward network, operating directly on the inputs and learning jointly with the generative model to represent those distributions.

Embodiments may provide unsupervised object and category discovery using deep networks. Embodiments may co-train a posterior model with a parametric model "explaining" the observed data according to the posterior. Thus, embodiments may provide end-to-end training of all components. Embodiments may provide additional tasks for semi-supervised training or with unsupervised feature pre-training. Embodiments may provide using this approach as additional intermediate computation between layers and learning a global context to otherwise uncontrolled intermediate features.

Embodiments may be applicable to techniques such as Few-Shot Learning (FSL) in particular and Learning with Less Labels (LWLL) in general. Embodiments may be applicable to techniques such as object detection/classification services. Embodiments may provide automatic discovery of potential objects of interest, which may open the door to a new (predictive) kind of FSL—preparing to admit new categories ahead of time.

Figure 1:
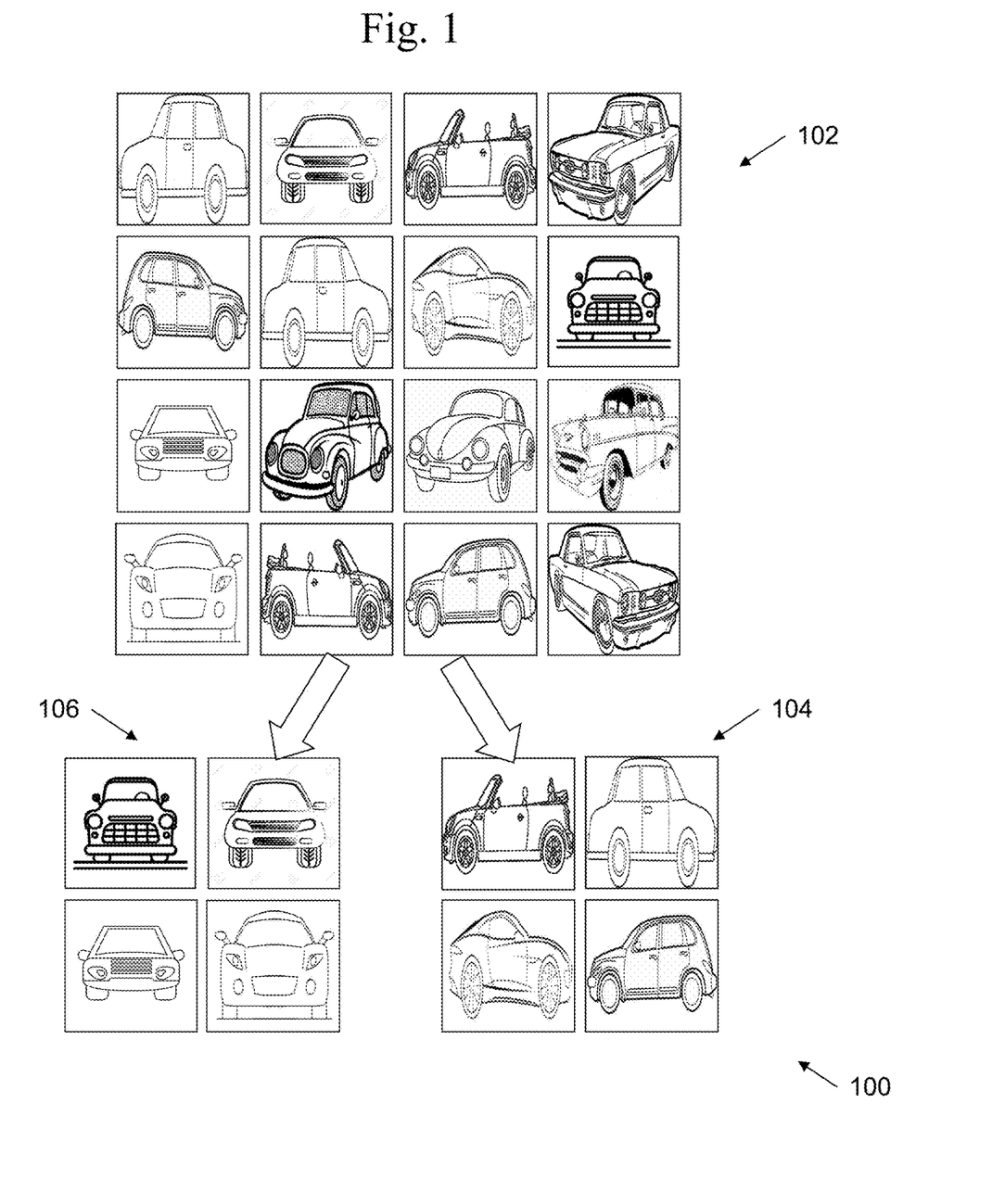
FIG. 1 illustrates an example of image classification according to embodiments of the present systems and methods.

An example of image classification 100 according to embodiments of the present systems and methods is shown in FIG. 1. As shown in this example, a collection of images 102 of various objects may be obtained from various sources. For example, image collection 102 may be obtained from cameras, databases, social media, etc. In this example, image collection 102 may include images of cars and embodiments may train on image collection 102 to learn to recognize images of cars. However, the cars in image collection 102 may appear in different positions, orientations, viewpoints, etc. in different images. Embodiments may uncover structure in image collection 102, even though that structure may not be obvious or may be hidden. For example, embodiments may categorize image collection 102 into image sets 104 and 106, where image set 104 may include images of cars from a side view and image set 106 may include images of cars from a front view, etc. Image collection 102 may include images of other objects than the objects of interest and may include image areas, features, and quality that may be considered "noise".

Parametric generative models may be used to describe a dataset with regard to variables of interest. Such models may include observed variables and unobserved variables. The model may be used to solve for the unobserved variables such that the unobserved variables generate the observed variables. Behind the variables may be a structure or dependency among the variables, which allow the model to learn a conditional distribution of the model and to use the learned conditional distribution to compute posterior probabilities. Neural networks may be used to learn predict the unobserved variables based on the observed variables, but typically, do not explain the data in the same that that parametric generative models may. Embodiments of the present systems and methods may implement parametric generative approaches using neural network approaches.

Figure 2:
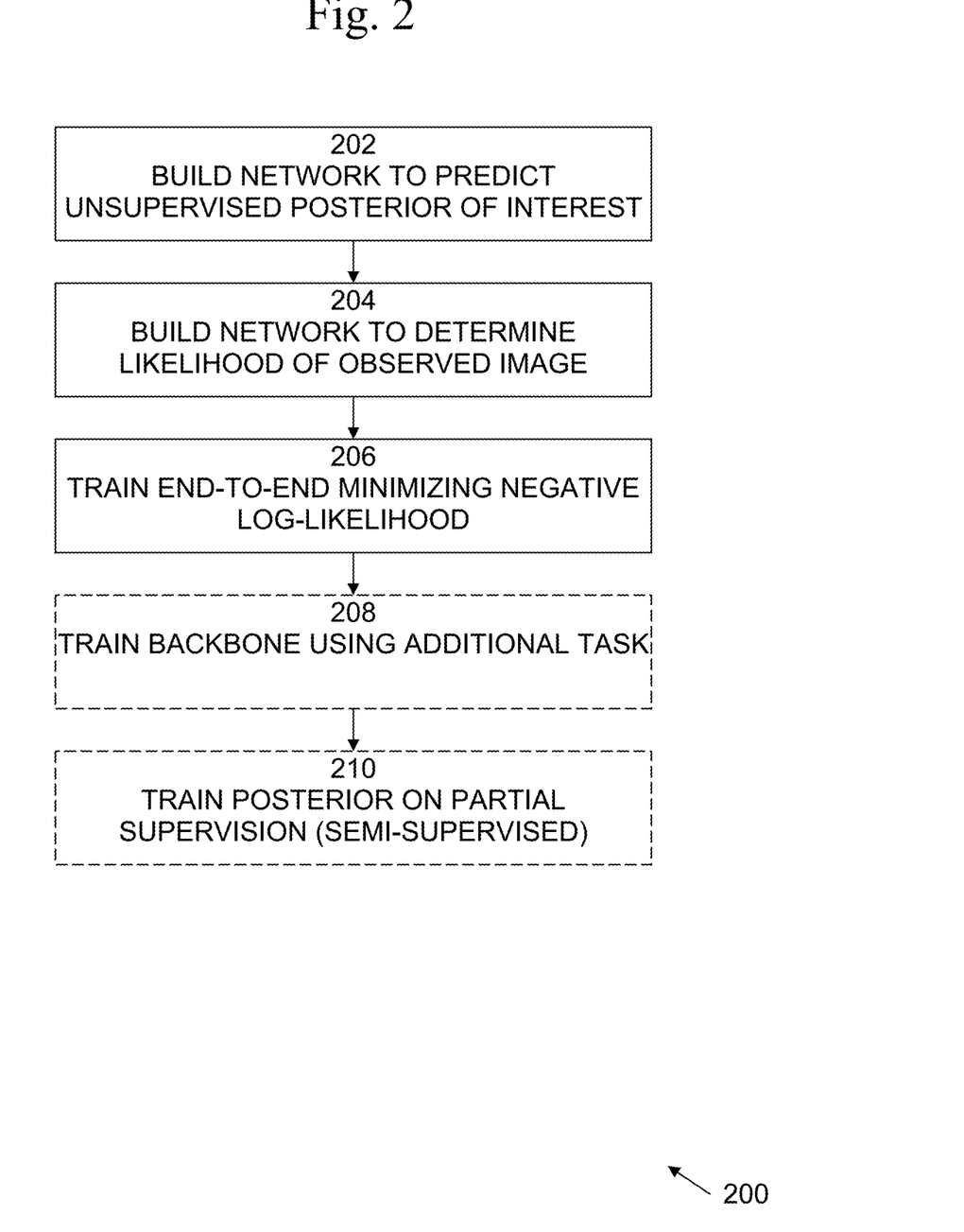
FIG. 2 is an exemplary flow diagram of a learning process according to embodiments of the present techniques.

An exemplary flow diagram of a learning process 200, according to embodiments of the present systems and methods is shown in FIG. 2. Process 200 may begin at 202, in which a generative probabilistic model may be built for predicting the unsupervised posterior of interest. For example, the generative probabilistic model may directly predict unobserved variables from the observed variables, such as a mapping from images to topics. At 204, the generative probabilistic model, which may be considered as a black box, may be trained and the predicted posterior may be computed inside the generative model, for example, using a Bayesian network. The generative probabilistic model may be built for computing the likelihood of the observed image (or back-bone features) for each outcome of the predicted posterior via a parametric generative model. At 206, the training may be end-to-end trying to minimize a negative Log-Likelihood function on the posterior, which increases the likelihood of the data. Embodiments may use this process with an unsupervised approach, such as the example of the car poses described above. Embodiments may use this process in a semi-supervised approach or in a fully supervised approach, which may provide a global outlook on the distributions of intermediate outputs of the network.

Optionally, at 208, a network backbone, such as a convolutional neural network (CNN) maybe trained using additional tasks. Further, optionally, at 210, the posterior may be trained using partial supervision, a semi-supervised approach.

Figure 3:
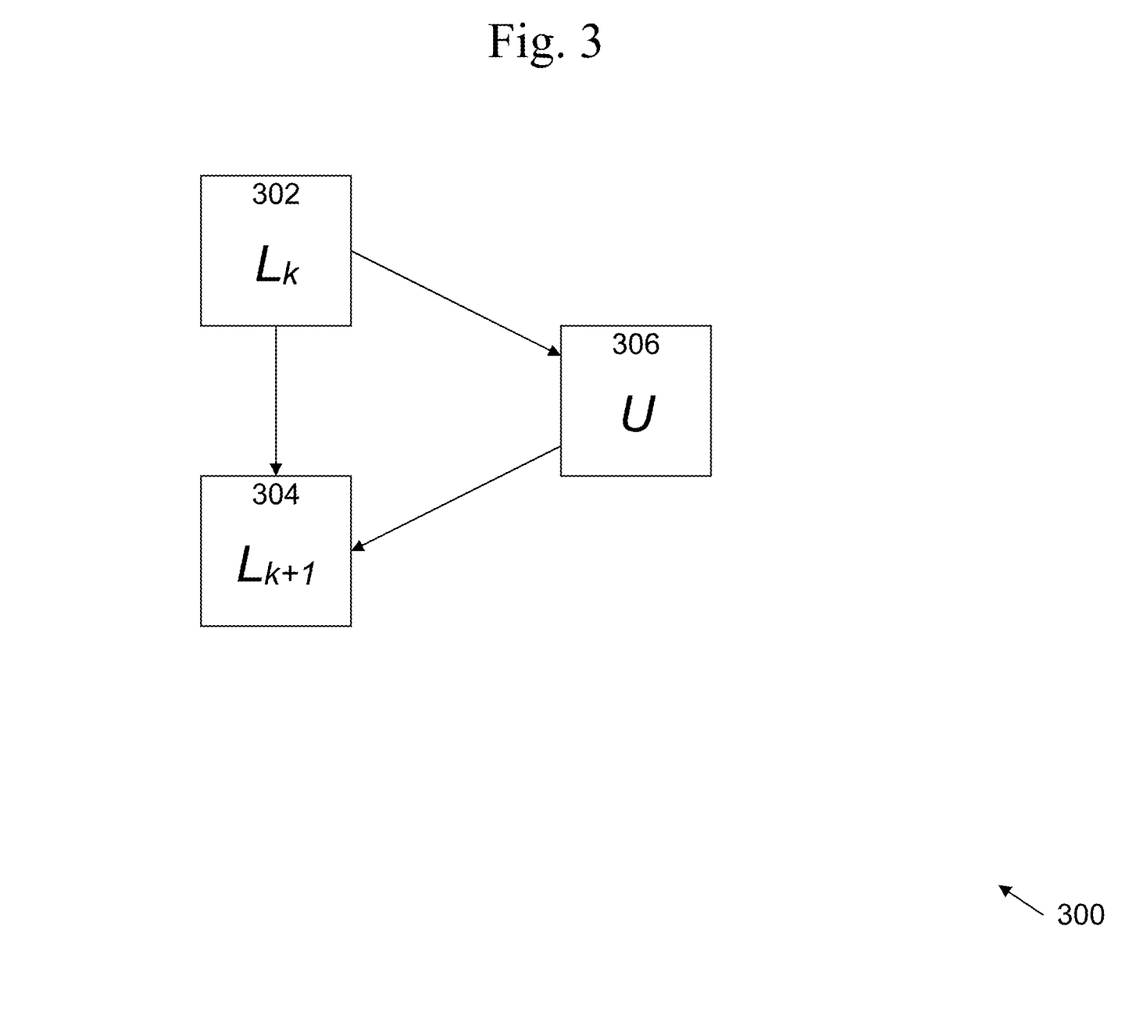
FIG. 3 illustrates an exemplary embodiment of the present systems and methods.

An exemplary embodiment 300 of the present systems and methods is shown in FIG. 3. A neural network of any type may include a plurality of layers, such as adjacent layers $L_k$ 302 and $L_{k+1}$ 304. An unsupervised layer U 306, in accordance with embodiments of the present systems and methods, may perform processing intermediate to adjacent layers $L_k$ 302 and $L_{k+1}$ 304. For example, unsupervised layer U 306 may receive data or intermediate data from layer $L_k$ 302, may perform processing on the data, and input the results to layer $L_{k+1}$ 304. Embodiments may perform unsupervised object discovery, unsupervised clustering, semi-supervised approaches, and may enhance fully supervised learning with (semantic) context for intermediate computations (augment local output with "global" model).

Figure 9:
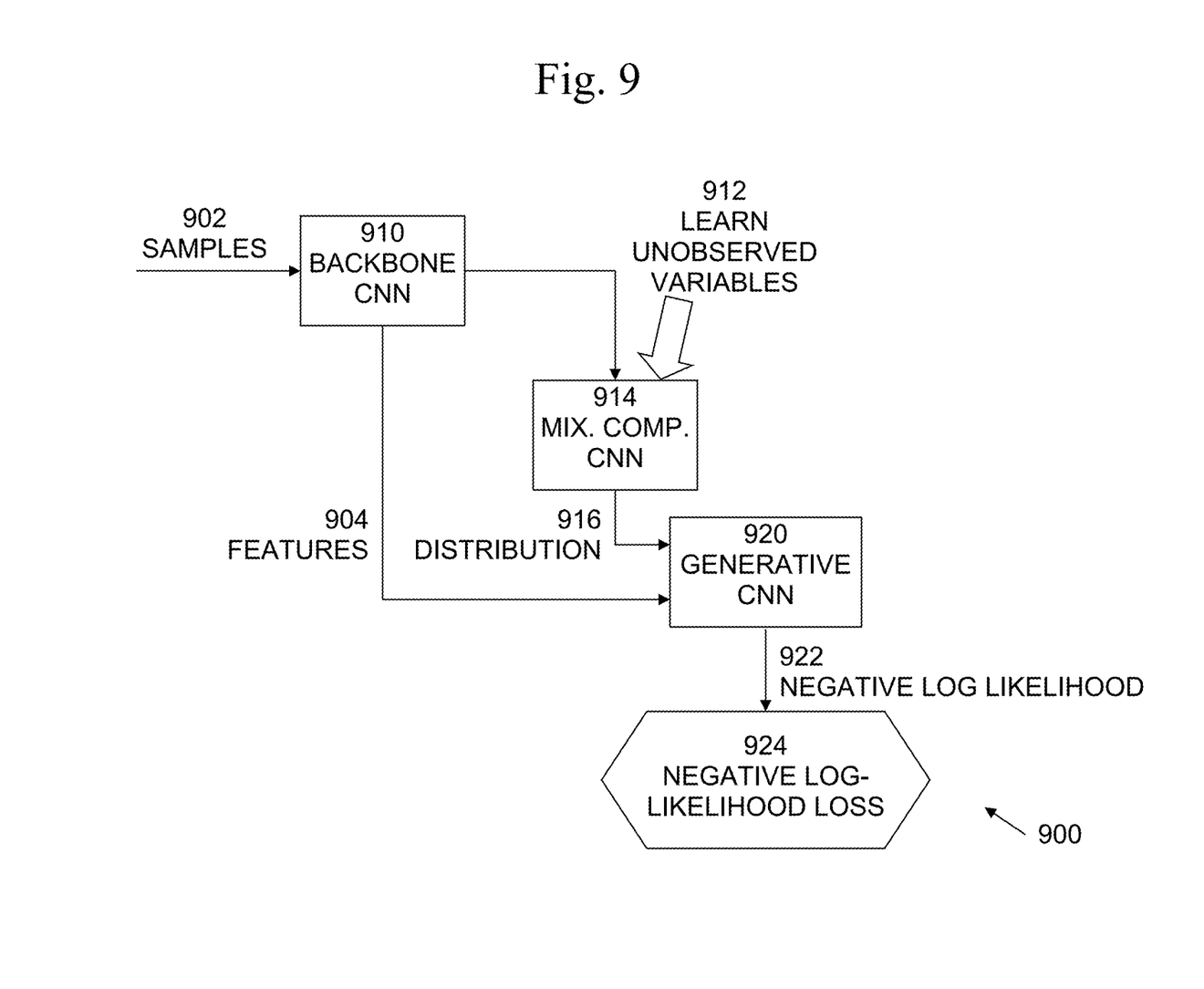
FIG. 9 illustrates an exemplary embodiment of the present systems and methods.

Referring to FIG. 9, an exemplary embodiment 900 of the present systems and methods is shown. In this example, samples 902, such as images, documents, etc., may include a mixture of topics, categories, classes, components, etc. For example, in the case of documents, a document may include multiple topics, such as politics, the weather, and cooking, and in the case of images, an image may include multiple objects of different types or configurations. Each item (word or object) in the document may be selected from one of those topics. In this case, the posterior to be learned 912 may be the unobserved variables, such as topics, categories, classes, components, etc. To start training, samples 908 may be fed to backbone CNN 910, which may extract features from the samples and may generate a feature vector representing the extracted features. The feature vector may be input to mixture component CNN 914, which may output distributions of possible values over the unobserved variables. For example, if the unobserved variables are topics, and the number of topics to be learned is specified, mixture component CNN 914 may output a topic vector W 916 indicating the probability distribution that the input feature vector belongs to each topic. The sum of the probabilities may equal 1. The feature vectors from backbone CNN 910 and the distributions from mixture component CNN 914 may be input to generative CNN 920. Generative CNN 920 may output a negative log likelihood 922, which may be input to negative log likelihood loss 924, which, in conjunction with generative CNN 920 may drive negative log likelihood 922 to zero, or near zero.

Figure 4:
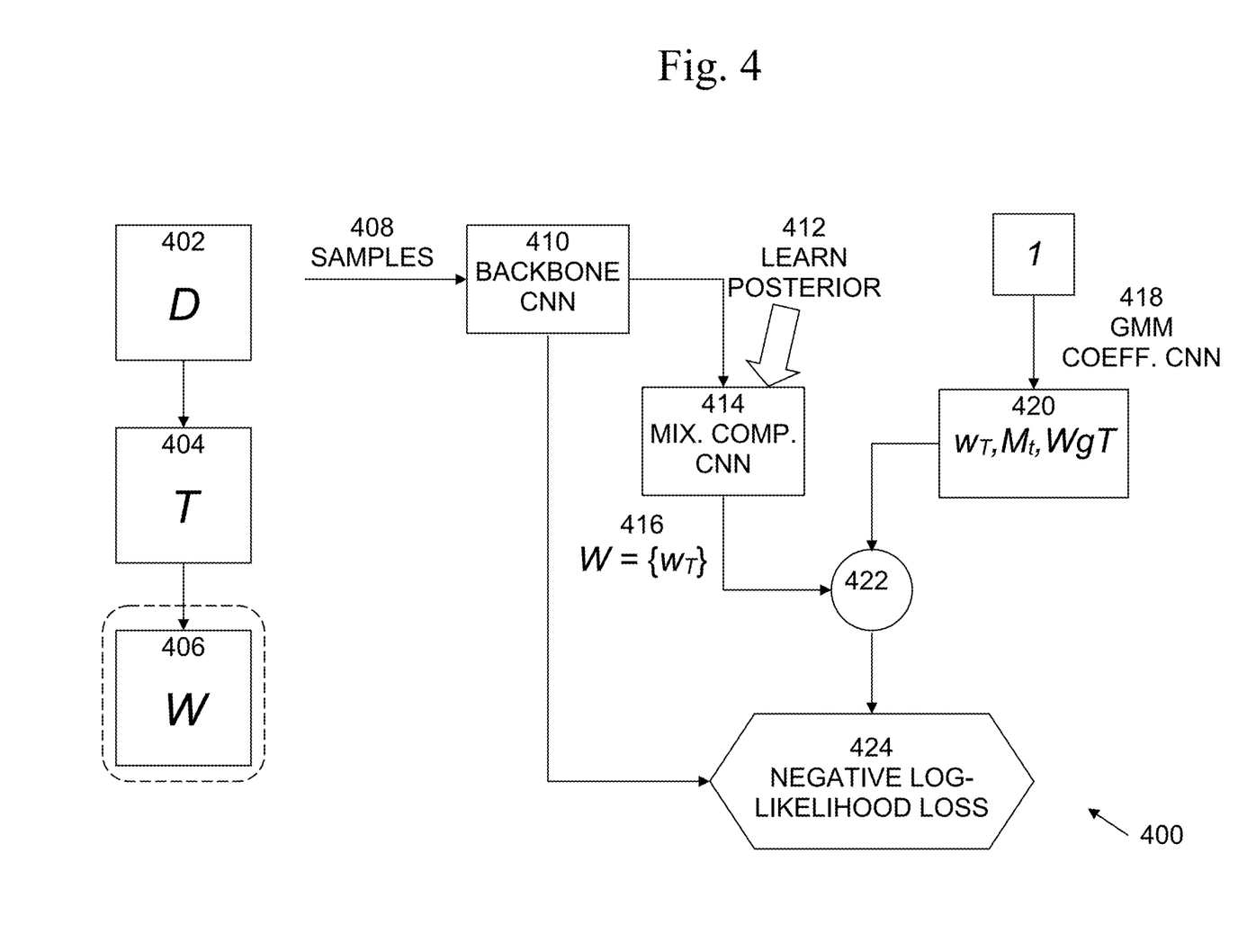
FIG. 4 illustrates an exemplary embodiment of the present systems and methods.

Turning now to FIG. 4, an exemplary embodiment 400 of the present systems and methods is shown. The general approach is that samples 402, such as documents, D, may be extracted to topics 404, T, which may be used to classify items 406, such as words, W. For example, in the case of images, the images may be the samples 402, D, the classes may be the topics 404, T, and the words 406, W, may be a feature vector representing sequences of words describing the image. The process may be repeated for each word in each document in a set or batch of documents.

In this example, samples 408, such as images, documents, etc., may include a mixture of topics. For example, in the case of documents, a document may include multiple topics, such as politics, the weather, and cooking, and in the case of images, an image may include multiple objects of different types or configurations. Each item (word or object) in the document may be selected from one of those topics. In this case, the posterior to be learned 412 may be the topics. To start training, samples 408 may be fed to backbone CNN 410, which may extract features from the samples and may generate a feature vector representing the extracted features. The feature vector may be input to mixture component CNN 414, which may output probabilities for belonging to each topic. For example, the number of topics or classes to be learned may be specified and mixture component CNN 414 may output a topic vector W 416 indicating the conditional probability that the input feature vector belongs to each topic. The sum of the probabilities may equal 1. The topics may be different Gaussian distributions which may have coefficients 418 defining parameters of the Gaussian distribution, such as the mean, variance, etc. 420, which may be learned from the data. The words or objects may be samples from a topic's Gaussian distribution. Given the topic vector W 416 and the parameters 420, the likelihood or probability 422 to sample the given feature vector from the MoG may be computed. For example, the probability 422 may be computed according to:

$$P(\vec{F}|d) \cong \sum_t w_t \exp\left((F-M_t)' \sum_t^{-1} (F-M_t)\right).$$

The negative log-likelihood loss 424 may be computed based on the probability 422 to sample the given feature vector. Negative log-likelihood loss 424 may be computed according to:

$$\text{loss} = -\sum_d \log(P(\vec{F}|d)).$$

As shown, the log-likelihood is summed over the documents in the batch.

It is to be noted that backbone CNN 410 may be replaced with any type of network. Further, the described embodiments may be used between any layers of any type of network and may provide a global outlook on the data.

Figure 5:
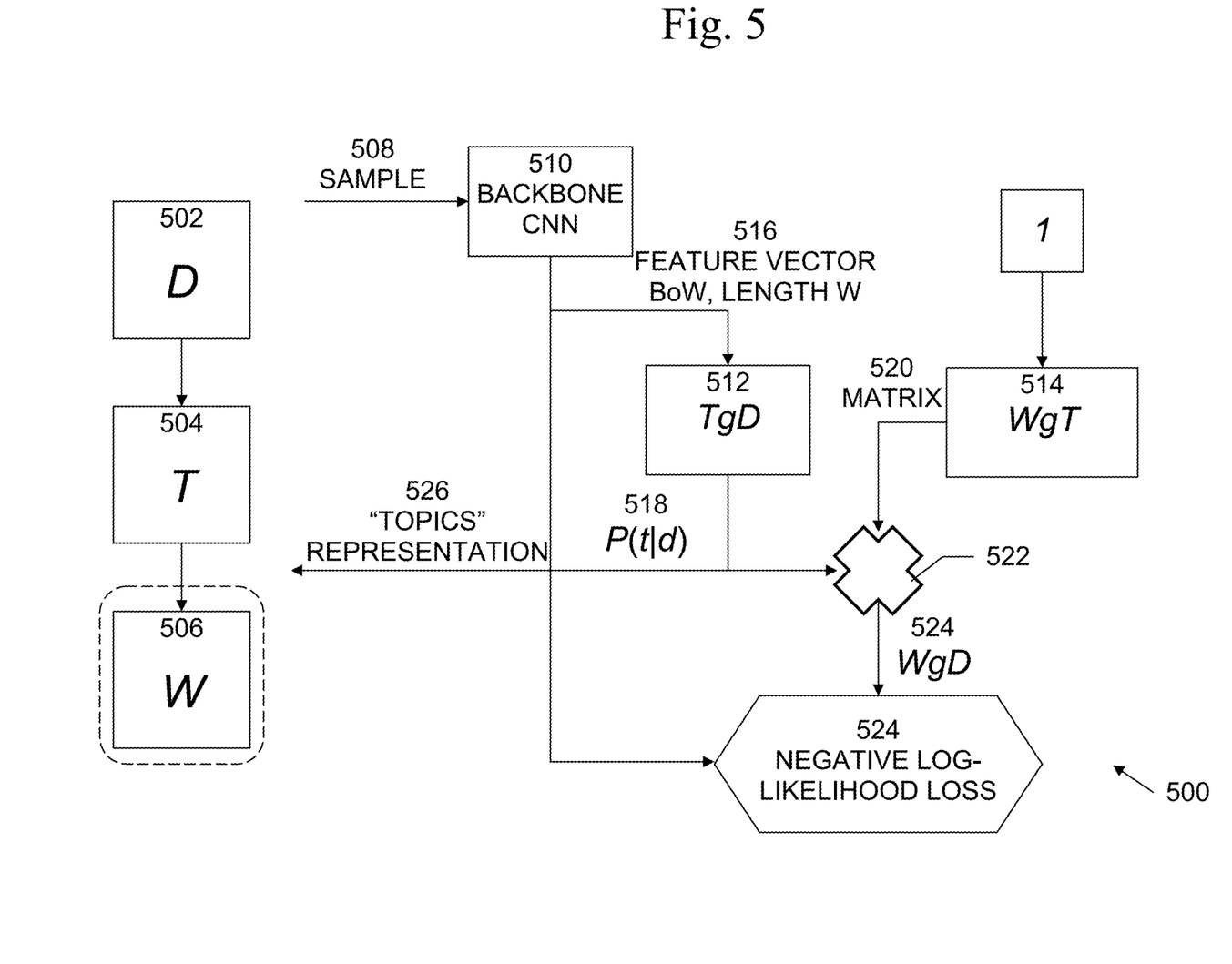
FIG. 5 illustrates an exemplary embodiment of the present systems and methods.

An exemplary embodiment 500 of the present systems and methods is shown in FIG. 5. This example is a probabilistic latent semantic analysis (pLSA) model, which is a discrete approach. The general approach is that samples 502, such as documents, D, may be extracted to topics 504, T, which may be used to classify items 506, such as words, W. For example, in the case of images, the images may be the samples 502, D, the classes may be the topics 504, T, and the words 506, W, may be a feature vector representing sequences of words describing the image. The process may be repeated for each word in each document in a set or batch of documents.

In this example, samples 508, such as images, documents, etc., may include a mixture of topics. Each item (word or object) in the document may be selected from one of those topics. In this example, terms used may include TgD=Topic given Document, WgT=Word given Topic, and WgD=Word given Document. The pLSA model is a discrete model, so there are two discrete distributions, a TgD discrete distribution and a WgT discrete distribution. The WgT distribution may indicate how likely each word is to be included in each topic or class. In this case, the posterior to be learned 510 may be the TgD distribution, which may indicate how likely each document is to be included in each topic or class. To start training, samples 508 may be fed to backbone CNN

510, which may extract features from the samples and may generate a feature vector 516 representing the extracted features, of length W. The feature vector may be input to a multinomial distribution, such as TgD distribution 512, which may output probabilities for each document belonging to each topic. For example, the number of topics or classes to be learned may be specified and TgD distribution 512 may output a topic vector P(t|d) 518. Topic vector P(t|d) 518 may be of length T, the number of topics and may indicate the conditional posterior probability that the input document, represented by the feature vector, belongs to each topic. Matrix 520, which may be learned from the data, may represent the training of WgT component 514. Matrix 520 may be a T×W matrix of model weights, converting topics to words, and defining the frequencies of each conversion. Vector 518 and matrix 520 may be multiplied 522 according to P(w|d)=WgD=WgT*TgD. and the likelihood or probability WgT 524 may be computed.

The negative log-likelihood loss 524 may be computed based on the probability 522 to sample the given feature vector. Negative log-likelihood loss 524 may be computed according to:

$$loss = -\Sigma_w F_w \log(P(w|d)).$$

As shown, the log-likelihood is summed over the documents in the batch.

Topic vector P(t|d) 518 turns out to be the desired output from the system, after training of the included networks. Accordingly, topics representation 526 may be used as the likelihood that each sample is included in each topic, after training. For example, for input images, embodiment 500 may accept input images and output the categories that are likely to correspond to the input images.

It is to be noted that backbone CNN 510 may be replaced with any type of network. Further, the described embodiments may be used between any layers of any type of network and may provide a global outlook on the data.

Figure 6:
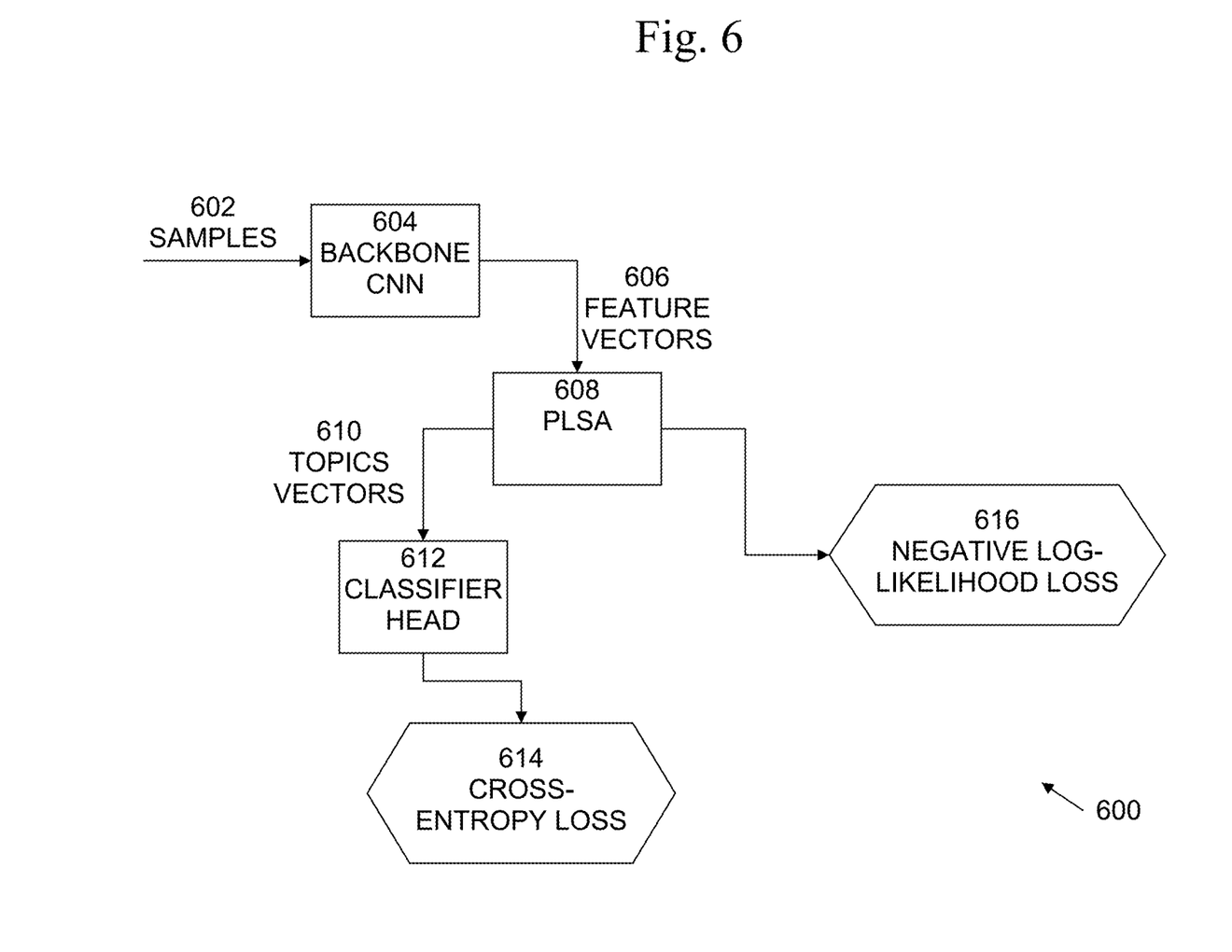
FIG. 6 illustrates an exemplary embodiment of the present systems and methods.

An exemplary embodiment 600 of the present systems and methods as applied to a semi-supervised approach is shown in FIG. 6. In this example, samples 602, such as images, documents, etc., may include a few labeled samples from a given set of classes {1 . . . K} and many unlabeled samples from the same set of classes. Backbone convolutional neural network (CNN) 604 may be trained to extract features from samples 602 to generate feature vectors 606, representing features found in samples 602. Probabilistic latent semantic analysis (pLSA) 608, for example, may be used to convert feature vectors 606 to topics vectors 610. PLSA is a statistical technique for the analysis of data that allows the derivation of a low-dimensional representation (such as topics) of the observed variables (such as features) in terms of their affinity to certain hidden variables. This technique may cluster the data and generate topic information for each cluster, such as summary or description information. Topics vectors 610 generated from labeled samples in 602 may be used to train classifier head 612 in a supervised process by applying a classification loss function, such as cross-entropy. The unlabeled samples included in 602 may be classified by using back bone CNN to compute feature vectors 606, which may be fed to PLSA component 608 to train PLSA component 608 using an unsupervised process, by applying a negative log-likelihood (unsupervised) loss function. For example, the negative log-likelihood loss function may be according to $-\Sigma_w F_w \log(P(w|d))$. This unsupervised training of PLSA component 608 may result in generation of improved topics vectors for classifier head 612.

It is to be noted that backbone CNN 604 may be replaced with any type of network. Further, the described embodiments may be used between any layers of any type of network and may provide a global outlook on the data.

Figure 7:
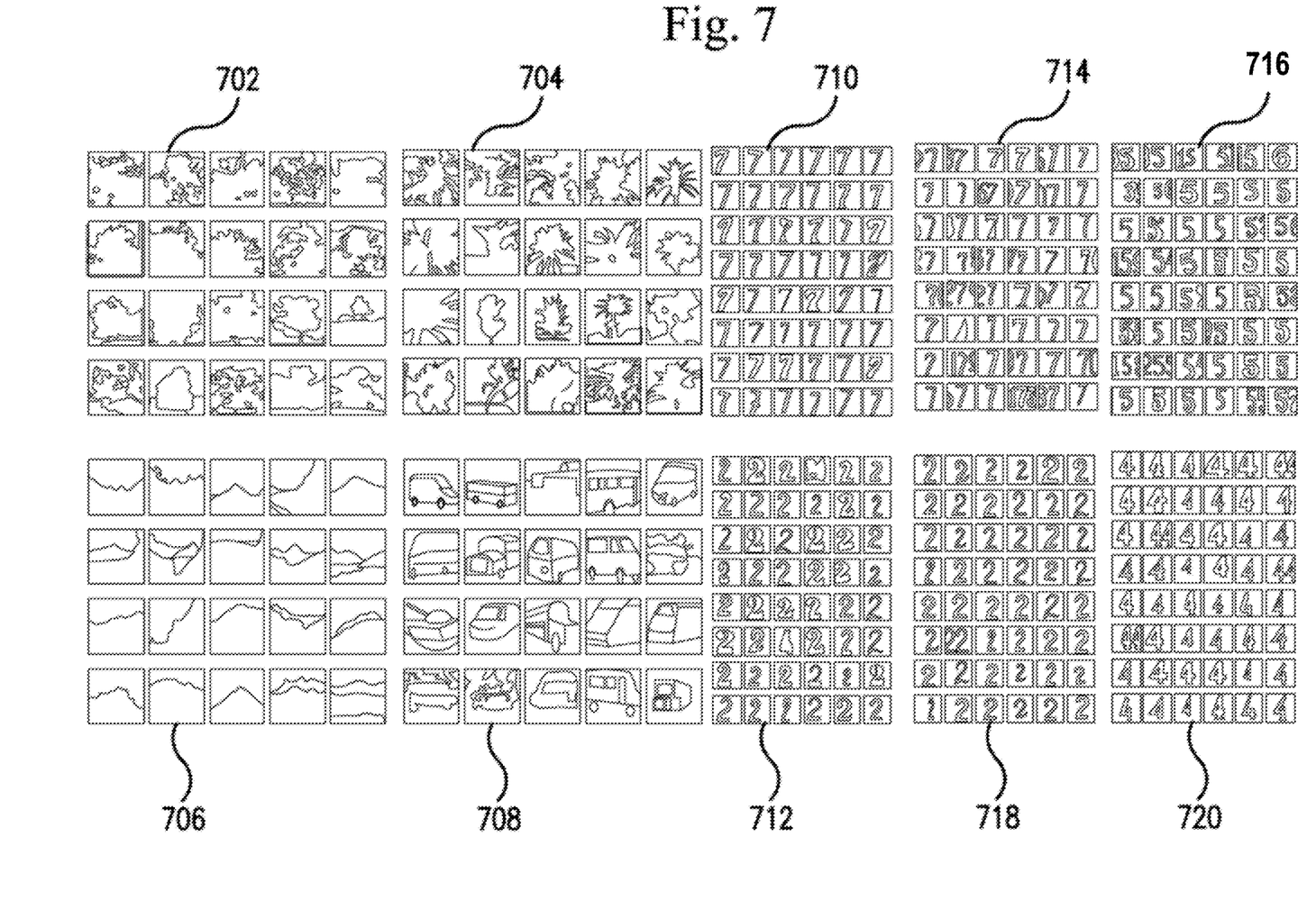
FIG. 7 illustrates an exemplary application of embodiments of the present systems and methods.

An example of application of embodiments of the present systems and methods is shown in FIG. 7. In embodiments, any images or other documents may be input and the system may discover categories into which the images or other documents, or portions thereof, may be put. In the example shown in FIG. 7, images, for example, 32×32 pixels, may be input and embodiments may categorize the images. For example, using pLSA, categories such as maple tree 702, palm tree 704, mountain 706, bus 708, "7" 710, and "2" 712 may be automatically discovered and generated. Likewise, using MoG, categories such as "7" 714, "5" 716, "2" 718, and "4" 420, may be automatically discovered and generated. Embodiments may automatically discover categories and output clusters of images that do not look the same, but which nevertheless, fall into the same categories or topics.

Figure 8:
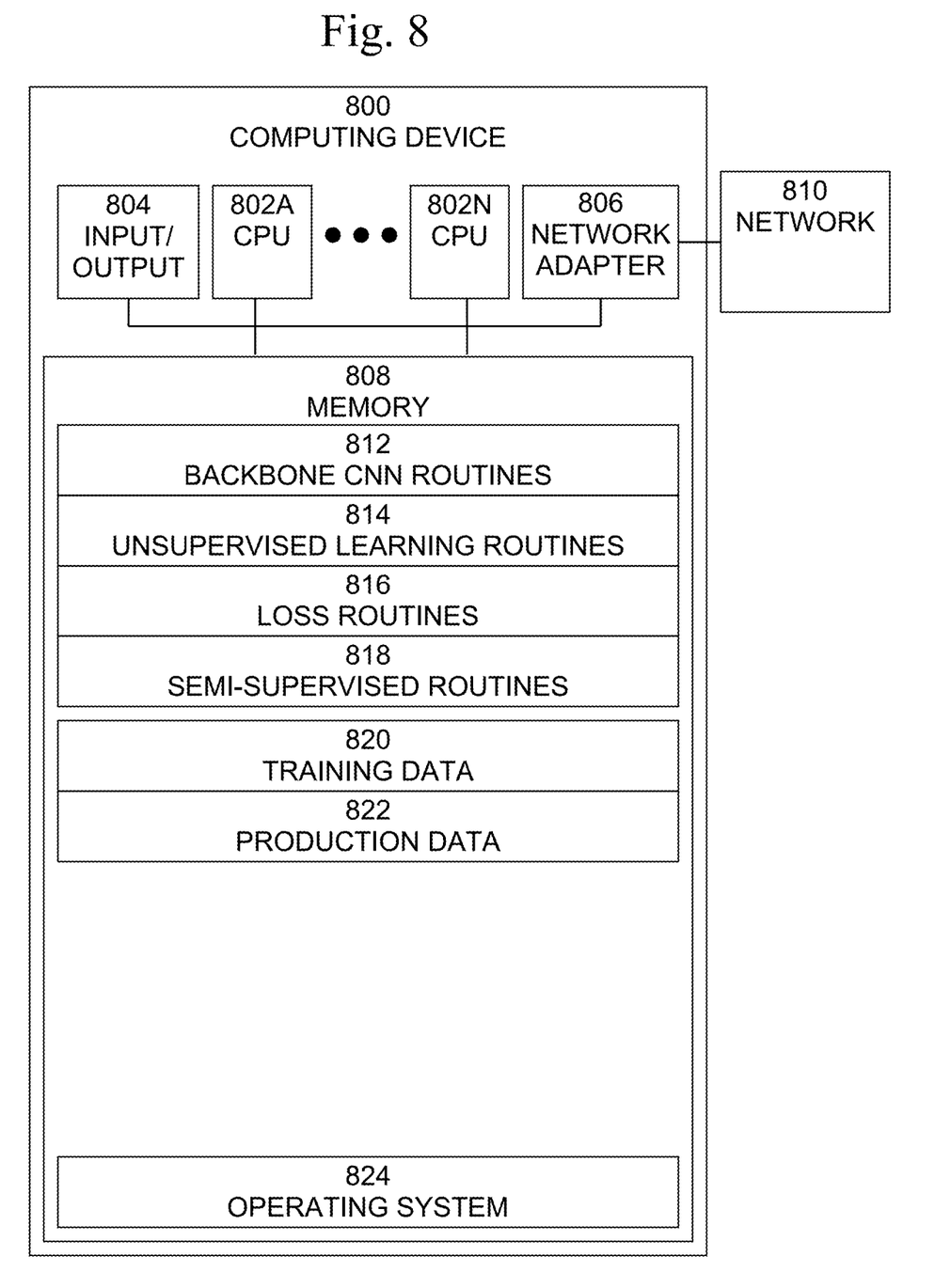
FIG. 8 is an exemplary block diagram of a computer system, in which processes involved in the embodiments described herein may be implemented.

An exemplary block diagram of a computer system 800, in which processes involved in the embodiments described herein may be implemented, is shown in FIG. 8. Computer system 800 may be implemented using one or more programmed general-purpose computer systems, such as embedded processors, systems on a chip, personal computers, workstations, server systems, and minicomputers or mainframe computers, or in distributed, networked computing environments. Computer system 800 may include one or more processors (CPUs) 802A-802N, input/output circuitry 804, network adapter 806, and memory 808. CPUs 802A-802N execute program instructions in order to carry out the functions of the present communications systems and methods. Typically, CPUs 802A-802N are one or more microprocessors, such as an INTEL CORE® processor. FIG. 8 illustrates an embodiment in which computer system 800 is implemented as a single multi-processor computer system, in which multiple processors 802A-802N share system resources, such as memory 808, input/output circuitry 804, and network adapter 806. However, the present communications systems and methods also include embodiments in which computer system 800 is implemented as a plurality of networked computer systems, which may be single-processor computer systems, multi-processor computer systems, or a mix thereof.

Input/output circuitry 804 provides the capability to input data to, or output data from, computer system 800. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 806 interfaces device 800 with a network 810. Network 810 may be any public or proprietary LAN or WAN, including, but not limited to the Internet.

Memory 808 stores program instructions that are executed by, and data that are used and processed by, CPU 802 to perform the functions of computer system 800. Memory 808 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 808 may vary depending upon the function that computer system 800 is programmed to perform. In the example shown in FIG. 8, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In embodiments, at least a portion of the software shown in FIG. 8 may be implemented on a current leader server. Likewise, in embodiments, at least a portion of the software shown in FIG. 8 may be implemented on a computer system other than the current leader server.

In the example shown in FIG. 8, memory 808 may include backbone CNN routines 812, unsupervised learning routines 814, loss routines 816, semi-supervised routines 818, training data 820, production data 822, and operating system 824. Backbone CNN routines 812 may include software routines to extract features from data samples and generate a feature vector representing the extracted features, according to embodiments described above. Unsupervised learning routines 814 may include software routines to perform automatic discovery of topics, classes, categories, etc., according to embodiments described above. Loss routines 816 may include software routines to perform, for example, negative log-likelihood computations, according to embodiments described above. Semi-supervised routines 818 may include software routines to provide semi-supervised training, according to embodiments described above. Training data 820 may include datasets and data samples that may be used for training of the described networks, according to embodiments described above. Production data 822 may include datasets and data samples that may be used during deployed operation and testing of the described networks, according to embodiments described above. Operating system 834 may provide overall system functionality.

As shown in FIG. 8, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method, implemented in a computer comprising a processor, memory accessible by the processor, and computer program instructions stored in the memory and executable by the processor, the method comprising:
    extracting, at a computer system, features from a dataset comprising a plurality of data samples using a backbone neural network to form a features vector for each data sample;
    training, at the computer system, using the features vectors for at least some of the plurality of data samples, an unsupervised generative probabilistic model to perform clustering of extracted features of the at least some of the plurality of data samples by minimizing a negative Log-Likelihood function, wherein clusters of extracted features form categories; and
    categorizing, at the computer system, at least some different data samples of the plurality of data samples, into the formed categories.

2. The method of claim 1, wherein the unsupervised generative probabilistic model comprises a mixture component convolutional neural network to accept the features vectors and to output distributions of possible values over unobserved variables of the model, a generative convolutional neural network to accept the features vectors and the distributions over the unobserved variables and to output a negative log likelihood, and a negative log likelihood loss to reduce the negative log likelihood.

3. The method of claim 2, wherein the unsupervised generative probabilistic model comprises a mixture component convolutional neural network to accept the features vectors and to output a mixture component vector indicating a conditional probability that each feature vector belongs to each mixture component; and
    computing, at the computer system, a probability that each topic is associated with each data sample based on the mixture component vector indicating a conditional probability that each feature vector belongs to each mixture component and based on a Gaussian distribution associated with each mixture component.

4. The method of claim 2, wherein the unsupervised generative probabilistic model comprises a multinomial distribution of topic given document to accept the features vectors and to output a topic vector indicating a conditional probability that each feature vector belongs to each topic.

5. The method of claim 4, further comprising:
    computing, at the computer system, a probability that each topic is associated with each data sample based on the topic vector returned by the mixture component convolutional network and indicating a conditional probability that each feature vector belongs to each topic, multiplied by matrix of model weights, converting topics to words, and defining the log-frequencies of each conversion, and further multiplied by the feature vector.

6. The method of claim 1, further comprising:
   generating, at the computer system, a topic vector indicating a conditional probability that each image represented by a feature vector belongs to each topic, and thus discovering the categories present in the data without any supervision; and
   training, at the computer system, a classifier model using a semi-supervised process including at least some labeled data samples, and applying a classification loss function.

7. The method of claim 1, further comprising using the method of claim 1 between intermediate layers of a neural network to learn a global context to uncontrolled intermediate features.

8. A system comprising a processor, memory accessible by the processor, and computer program instructions stored in the memory and executable by the processor to perform:
   extracting, at a computer system, features from a dataset comprising a plurality of data samples using a backbone neural network to form a features vector for each data sample;
   training, at the computer system, using the features vectors for at least some of the plurality of data samples, an unsupervised generative probabilistic model to perform clustering of extracted features of the at least some of the plurality of data samples by minimizing a negative Log-Likelihood function, wherein clusters of extracted features form categories; and
   categorizing, at the computer system, at least some different data samples of the plurality of data samples, into the formed categories.

9. The system of claim 8, wherein the unsupervised generative probabilistic model comprises a mixture component convolutional neural network to accept the features vectors and to output distributions of possible values over unobserved variables of the model, a generative convolutional neural network to accept the features vectors and the distributions over the unobserved variables and to output a negative log likelihood, and a negative log likelihood loss to reduce the negative log likelihood.

10. The system of claim 9, wherein the unsupervised generative probabilistic model comprises a mixture component convolutional neural network to accept the features vectors and to output a mixture component vector indicating a conditional probability that each feature vector belongs to each mixture component; and
   computing, at the computer system, a probability that each topic is associated with each data sample based on the mixture component vector indicating a conditional probability that each feature vector belongs to each mixture component and based on a Gaussian distribution associated with each mixture component.

11. The system of claim 9, wherein the unsupervised generative probabilistic model comprises a multinomial distribution of topic given document to accept the features vectors and to output a topic vector indicating a conditional probability that each feature vector belongs to each topic.

12. The system of claim 11, further comprising:
   computing, at the computer system, a probability that each topic is associated with each data sample based on the topic vector returned by the mixture component convolutional network and indicating a conditional probability that each feature vector belongs to each topic, multiplied by matrix of model weights, converting topics to words, and defining the log-frequencies of each conversion, and further multiplied by the feature vector.

13. The system of claim 8, further comprising:
   generating, at the computer system, a topic vector indicating a conditional probability that each image represented by a feature vector belongs to each topic, and thus discovering the categories present in the data without any supervision; and
   training, at the computer system, a classifier model using a semi-supervised process including at least some labeled data samples, and applying a classification loss function.

14. The system of claim 8, further comprising using the system of claim 8 between intermediate layers of a neural network to learn a global context to uncontrolled intermediate features.

15. A computer program product comprising a non-transitory computer readable storage having program instructions embodied therewith, the program instructions executable by a computer, to cause the computer to perform a method comprising:
   extracting, at a computer system, features from a dataset comprising a plurality of data samples using a backbone neural network to form a features vector for each data sample;
   training, at the computer system, using the features vectors for at least some of the plurality of data samples, an unsupervised generative probabilistic model to perform clustering of extracted features of the at least some of the plurality of data samples by minimizing a negative Log-Likelihood function, wherein clusters of extracted features form categories; and
   categorizing, at the computer system, at least some different data samples of the plurality of data samples, into the formed categories.

16. The computer program product of claim 15, wherein the unsupervised generative probabilistic model comprises a mixture component convolutional neural network to accept the features vectors and to output distributions of possible values over unobserved variables of the model, a generative convolutional neural network to accept the features vectors and the distributions over the unobserved variables and to output a negative log likelihood, and a negative log likelihood loss to reduce the negative log likelihood.

17. The computer program product of claim 16, wherein the unsupervised generative probabilistic model comprises a mixture component convolutional neural network to accept the features vectors and to output a mixture component vector indicating a conditional probability that each feature vector belongs to each mixture component; and
   computing, at the computer system, a probability that each topic is associated with each data sample based on the mixture component vector indicating a conditional probability that each feature vector belongs to each mixture component and based on a Gaussian distribution associated with each mixture component.

18. The computer program product of claim 16, wherein the unsupervised generative probabilistic model comprises a multinomial distribution of topic given document to accept the features vectors and to output a topic vector indicating a conditional probability that each feature vector belongs to each topic; and
   the method further comprises computing, at the computer system, a probability that each topic is associated with each data sample based on the topic vector returned by the mixture component convolutional network and indicating a conditional probability that each feature vector belongs to each topic, multiplied by matrix of model weights, converting topics to words, and defining the log-frequencies of each conversion, and further multiplied by the feature vector.

19. The computer program product of claim 15, further comprising:
   generating, at the computer system, a topic vector indicating a conditional probability that each image represented by a feature vector belongs to each topic, and thus discovering the categories present in the data without any supervision; and
   training, at the computer system, a classifier model using a semi-supervised process including at least some labeled data samples, and applying a classification loss function.

20. The computer program product of claim 15, further comprising using the computer program product of claim 15 between intermediate layers of a neural network to learn a global context to uncontrolled intermediate features.

\* \* \* \* \*